United States Patent [19]
Barnett

[11] Patent Number: 4,628,583
[45] Date of Patent: Dec. 16, 1986

[54] STRAIN TRANSDUCERS

[75] Inventor: John D. Barnett, Norfolk, Great Britain

[73] Assignee: TRW Probe Electronics Co. Ltd, Gloucestershire, Great Britain

[21] Appl. No.: 611,910

[22] Filed: May 18, 1984

[30] Foreign Application Priority Data

May 19, 1983 [GB] United Kingdom ................ 8313834

[51] Int. Cl.[4] ........................ B23P 19/02; B25B 23/14
[52] U.S. Cl. .................................... 29/525; 73/862.25
[58] Field of Search ........... 73/862.65, 862.66, 862.57, 73/768; 29/525

[56] References Cited

U.S. PATENT DOCUMENTS

| | | | |
|---|---|---|---|
| 3,447,367 | 6/1969 | Taylor | 73/862.65 |
| 3,473,375 | 10/1969 | Jenkins | 73/862.65 |
| 3,742,760 | 7/1973 | Kato | 73/141 A |
| 4,342,233 | 8/1982 | Edmundson et al. | 73/862.06 |
| 4,412,456 | 11/1983 | Wilhelm et al. | 73/768 |

FOREIGN PATENT DOCUMENTS

| | | |
|---|---|---|
| 0127278 | 3/1984 | European Pat. Off. . |
| 1518359 | 7/1978 | United Kingdom . |
| 2050624 | 8/1983 | United Kingdom . |

*Primary Examiner*—Howard N. Goldberg
*Assistant Examiner*—Steven Nichols
*Attorney, Agent, or Firm*—Yount & Tarolli

[57] ABSTRACT

A strain transducer is adapted to measure strain at a chosen depth below the surface of a workpiece, such as at the neutral axis of a draft bar. The transducer has a hollow cylindrical plug (6) projecting from a co-axial shoulder (7) of slightly larger diameter, the distal end of the plug being force fitted with a disc-like diaphragm (9) on which strain gauges (10) are mounted. These are on the inside face, and connections (11) extend up inside the plug to encapsulated electronic circuitry at the proximal end. The workpiece is bored (3) to an extent greater than the chosen depth and then counterbored (4) to match the plug and shoulder, and the transducer is inserted with an interference fit.

6 Claims, 2 Drawing Figures

STRAIN TRANSDUCERS

This invention relates to strain transducers and is a development of that described in British Pat. No. 2050624B.

In that Patent there is described a strain transducer primarily for measuring strains at the surface of a workpiece. A hole is drilled and a small cylindrical plug-like element inserted. This has a transverse diaphragm on which the strain gauges are mounted or deposited so that they lie coplanar with the surface of the workpiece when the plug is properly "home". However, it is often desired to measure strain at other points. In particular, it is frequently useful to know the strain on the neutral axis of a structural member, where one is concerned only with tension or compression and not with any bending forces. It is the aim of this invention to develop the strain transducer of the plug and diaphragm type to solve this problem.

According to one aspect of the present invention there is provided a strain transducer comprising a carrier member in the form of a generally cylindrical plug-like member for insertion with an interference fit into an opening in the surface of a structure to be monitored and and having a diaphragm spanning its distal end on which is secured at least one strain gauge, the face of the diaphragm on which the gauge is mounted being disposed substantially parallel or coplanar with the direction of strain to be measured.

Conveniently, the diaphragm is in the form of a disc which is force fitted into the open distal end of the tubular plug-like member. The strain gauge is mounted on it first, before fitting, on the side that will be concealed within the tubular plug, facing the proximal end. Electrical connections can be led up the inside of the cylinder to an electronic assembly which can be encapsulated on the proximal end of the plug, which remains exposed.

It will be understood that there can be more than one gauge on the same surface; indeed there will usually be at least two mutually at right angles.

Preferably, the plug-like member is of stepped configuration, with an elongated tubular stem projecting from an annular shoulder of larger diameter at the proximal end.

According to another aspect of the present invention there is provided a method of determining strain at a chosen depth below the surface of a workpiece, comprising drilling a transverse hole from the surface to a depth exceeding the chosen one, counterboring the mouth of the hole, and inserting the plug-like member of a strain transducer as defined above with an interference fit in said hole to an extent where the strain gauge face of the diaphragm is at the chosen depth.

For a better understanding of the invention, one embodiment will now be described, by way of example, with reference to the accompanying drawing, in which.

Figure 1:
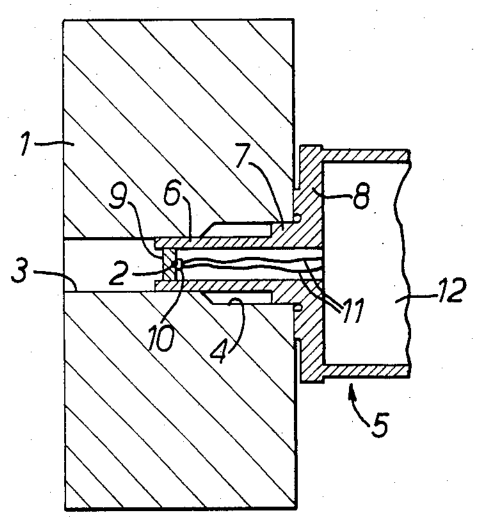
FIG. 1 is an axial section of a strain transducer in a workpiece.

In FIG. 1, a generally rectangular section member 1 is required to have its strain measured at its neutral axis 2. A bore 3 is drilled transversely through the member 1, and then a counterbore 4 is made, approaching but not right up to the neutral axis, from one side only.

The bore and counterbore match the dimensions of parts of a strain transducer 5. This has a cylindrical tubular stem 6 projecting co-axially from an annular shoulder 7 beneath a base plate 8. The stem is an interference fit in the bore 3, while the cylindrical surface of the shoulder 7 is a slightly lighter fit at the mouth of the counterbore 4.

Inserted with a force fit into the distal end of the stem is a diaphragm 9. This has strain gauges 10 deposited on it in mutually perpendicular orientations. Electrical wires 11 lead from the gauges up inside the stem to electronic equipment encapsulated in a compartment 12 on the base outside the member 1. The strain gauges are deposited and the leads attached before the diaphragm is press fitted into the tubular stem.

Figure 2:
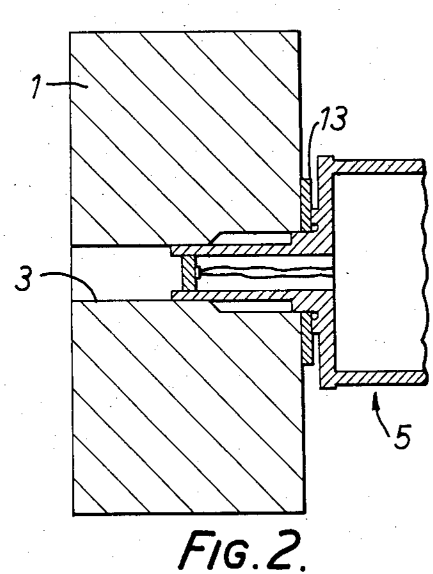
FIG. 2 is a similar axial section showing an adjustment of the transducer.

It will of course not always happen that the length of the plug-like member will bring the strain gauge surface of the diaphragm exactly onto the neutral axis. This can readily be adjusted by the use of shims 13 as illustrated in FIG. 2.

In the figures, various dimensions have been exaggerated for clarity, particularly the diameter of the counterbore 4 in relation to that of the bore 3. Typical dimensions might be a 7 mm bore 3 and a 9 mm counterbore 4, while the depth of the neutral axis from the surface could be of the order of 15 mm.

A particular application of this strain gauge arrangement is to draft bars of agricultural tractors, when ploughing or engaged in other heavy duty operations. These tend to be subject to significant bending forces due to friction at pivots and poor alignment, and so measurement at the surface does not give a true indication of the draft bar tension.

I claim:

1. A strain transducer for measuring strains at a location within a workpiece having a through bore which is substantially uniform and symmetrical about a bore axis, said strain transducer comprising:

a generally tubular plug-like member having a portion with a central bore and insertable into said workpiece bore in interference fit therewith at its distal end;

a disc located within and spaning the central bore of said portion of said plug-like member near said distal end, force in the radial plane of said disc effecting proportional deflection of said disc in the radial plane; and at least one strain guage mounted on the disc for producing an electrical signal responsive to such distortion in the radial plane.

2. A strain transducer as claimed in claim 1, wherein the disc is force fitted into the open distal end of the tubular plug-like member.

3. A strain transducer as claimed in claim 1 or 2, wherein the or each strain gauge is mounted on the side of the diaphragm facing the proximal end.

4. A strain transducer as claimed in claim 1, 2 or 3, wherein there are two strain gauges mutually at right angles.

5. A strain transducer as claimed in claim 1, 2 or 3 wherein the plug-like member has a stepped configuration, being of smaller outer diameter at the distal end than the proximal end, and the bore being counterbored to receive the proximal end with a fit less tight than said interference fit.

6. A method of determining strain at a chosen depth below the surface of a workpiece, comprising drilling a transverse hole through the workpiece, counterboring the mouth of the hole, and inserting the plug-like member of a strain transducer as claimed in claim 1 with an interference fit in said hole to an extent where the strain guage face of the disc is at the chosen depth.

* * * * *

UNITED STATES PATENT AND TRADEMARK OFFICE

CERTIFICATE OF CORRECTION

PATENT NO. : 4,628,583

DATED : December 16, 1986

INVENTOR(S) : John D. Barnett

It is certified that error appears in the above-identified patent and that said Letters Patent is hereby corrected as shown below:

Column 2, line 52 change "diaphragm" to -- disc --.

Signed and Sealed this

Third Day of March, 1987

*Attest:*

DONALD J. QUIGG

*Attesting Officer*

*Commissioner of Patents and Trademarks*